US005697080A

United States Patent [19]

Kasa

[11] Patent Number: 5,697,080

[45] Date of Patent: Dec. 9, 1997

[54] METHOD OF AND APPARATUS FOR SELECTING STATION IN MULTIPLEXED BROADCAST, AND RECEIVING SYSTEM

[75] Inventor: Koichi Kasa, Kawagoe, Japan

[73] Assignee: Pioneer Electronic Corporation, Tokyo-to, Japan

[21] Appl. No.: 450,952

[22] Filed: May 23, 1995

[30] Foreign Application Priority Data

May 24, 1994 [JP] Japan .................................... 6-110033

[51] Int. Cl.[6] .................................................. H04B 1/18

[52] U.S. Cl. .................. 455/228; 455/158.2; 455/184.1; 455/186.2

[58] Field of Search .............................. 455/152.1, 158.1, 455/158.2, 185.2, 185.1, 186.1, 186.2, 45, 184.1

[56] References Cited

U.S. PATENT DOCUMENTS

| | | | |
|---|---|---|---|
| 4,954,899 | 9/1990 | Tanabe et al. | 455/186.2 |
| 5,241,696 | 8/1993 | Mori et al. | 455/186.2 |
| 5,345,607 | 9/1994 | Liman et al. | 455/186.1 |
| 5,379,454 | 1/1995 | Takegawa et al. | 455/186.2 |
| 5,465,402 | 11/1995 | Ono et al. | 455/188.2 |
| 5,548,828 | 8/1996 | Kozaki et al. | 455/186.1 |

FOREIGN PATENT DOCUMENTS

| | | | |
|---|---|---|---|
| 2-39628 | 2/1990 | Japan | 455/186.2 |

*Primary Examiner*—Reinhard J. Eisenzopf
*Assistant Examiner*—Sam Bhattacharya
*Attorney, Agent, or Firm*—Morgan, Lewis & Bockius LLP

[57] ABSTRACT

A method of selecting one of broadcast waves, which are received by a receiving system for receiving the broadcast waves in each of which a sub signal including input sorting information to indicate a sort of broadcast for each of the broadcast waves is multiplexed a main signal, includes the steps of: setting a set sorting information to specify a desired sort of broadcast to be received; judging whether or not the input sorting information of each of the received broadcast waves is coincident with the set sorting information; storing the input sorting information if the input sorting information is not judged to be coincident by the judging step; firstly selecting one of the broadcast waves having the input sorting information, which is judged to be coincident by the judging step, if at least one of the input sorting information is judged to be coincident by the judging step; and secondly selecting one of the broadcast waves having the input sorting information, which is not judged to be coincident by the judging step, on the basis of the stored input sorting information if none of the input sorting information is judged to be coincident by the judging step.

14 Claims, 6 Drawing Sheets

FIG. 2

| ADDRESS | PTY CODE | BROADCAST IDENTIFIER | RECEIVING FREQUENCY | RECEIVING CONDITION |
|---|---|---|---|---|
| 1 | PTY1 | PI1 | f1 | Q1 |
| 2 | PTY2 | PI2 | f2 | Q2 |
| ⋮ | ⋮ | ⋮ | ⋮ | ⋮ |
| ⋮ | ⋮ | ⋮ | ⋮ | ⋮ |
| i | PTYi | PIi | fi | Qi |

METHOD OF AND APPARATUS FOR SELECTING STATION IN MULTIPLEXED BROADCAST, AND RECEIVING SYSTEM

BACKGROUND OF THE INVENTION

1. Field of the Invention

The present invention generally relates to a receiving system for receiving a so-called RDS (Radio Data System) broadcast, and more particularly to a receiving system for selecting a station by use of a so-called PTY code (Program TYpe code) information and a station selecting method thereof.

2. Description of the Related Art

The RDS broadcast is a multiplexed broadcast in which the additional information of high validity is superimposed on an audio signal in an on-vehicle type radio etc.. This additional information includes a station selection information necessary to specify the broadcasting station in the area, the traffic information etc., and is standardized as the format related to the RDS broadcast.

The data format of this RDS broadcast has the additional information such as a program identifier information (PI code), a group type code and a PTY code other than the audio signal. Among those, the PTY code plays a roll of identifying the program type (such as a music program, a news program and a sport program) i.e. plays a roll as the program type information.

A receiver for searching the broadcast wave of the desired broadcast content by an easy operation by use of this PTY code is proposed in Japanese Patent Laid Open Hei 4-336, 809. In the station selection by the searching operation of these receivers, the user firstly specifies the program type by use of the operation key. Nextly, the PTY code, which is generated from this program type (hereinbelow, it is called as "the set PTY code"), is compared with the PTY code of the additional information as for the RDS broadcast which is selected and modulated by the tuner (hereinbelow, it is called as "the input PTY code"). If the set PTY code and the input PTY code are not coincident with each other, the broadcasting station of the other frequency is searched. This operation is continued until those set and input PTY codes are coincident with each other.

However, in the above mentioned method of selecting the station of the multiplexed broadcast and the receiver by means of this method, there is such a problem that the station selection is only possible with respect to the PTY which the user selects. Namely, there may be a case where, when it is not possible to receive the set PTY, the user wishes to select the station by the other PTY, for example. In this kind of case, it is necessary to perform a re-searching operation by use of the other PTY according to the above mentioned related art. However, even if such a re-searching operation is conducted, there is no guarantee to certainly establish the station selection on the basis of the other PTY.

SUMMARY OF THE INVENTION

It is therefore an object of the present invention to provide a method of and an apparatus for selecting the station of the multiplexed broadcast, and a receiving system, in which the selection based on the desired PTY or the selection of the other receivable broadcasting station can be easily done by making the best use of one searching operation.

The above object of the present invention can be achieved by a method of selecting one of broadcast waves, which are received by a receiving system for receiving the broadcast waves in each of which a sub signal including input sorting information to indicate a sort of broadcast for each of the broadcast waves is multiplexed on a main signal. The selecting method includes the steps of: setting a set sorting information to specify a desired sort of broadcast to be received; judging whether or not the input sorting information of each of the received broadcast waves is coincident with the set sorting information; storing the input sorting information if the input sorting information is not judged to be coincident by the judging step; firstly selecting one of the broadcast waves having the input sorting information, which is judged to be coincident by the judging step, if at least one of the input sorting information is judged to be coincident by the judging step; and secondly selecting one of the broadcast waves having the input sorting information, which is not judged to be coincident by the judging step, on the basis of the stored input sorting information if none of the input sorting information is judged to be coincident by the judging step.

According to the selecting method of the present invention, the broadcast waves are received by the receiving system. In each of the broadcast waves, the sub signal including the input sorting information is multiplexed on the main signal. The input sorting information e.g. the PTY code, the PI code, the group type code, indicates a sort of broadcast for each of the broadcast waves. The set sorting information to specify a desired sort of broadcast to be received is set in advance by a user. After that, when a desired broadcast is to be searched by the user, it is judged whether or not the input sorting information of each of the received broadcast waves is coincident with the set sorting information. According to the result of this judgement, if the input sorting information is not judged to be coincident with the set sorting information, the input sorting information is stored. If at least one of the input sorting information is judged to be coincident with the set sorting information, one of the broadcast waves having the input sorting information, which is judged to be coincident with the set sorting information, is selected as the desired broadcast which belongs to the originally desired sort of broadcast. On the other hand, if none of the input sorting information is judged to be coincident with the set sorting information, one of the broadcast waves having the input sorting information, which is not judged to be coincident with the set sorting information, is selected, on the basis of the stored input sorting information, as the desired broadcast which does not belong to the originally desired sort of broadcast but which is still receivable. In this manner, the selection of one broadcast based on the desired sort of broadcast or the selection of another receivable broadcast can be easily performed by making the best use of one searching operation according to the selecting method of the present invention.

In one aspect of the selecting method of the present invention, the selecting method further includes the step of notifying the stored input sorting information if none of the input sorting information is judged to be coincident by the judging step. Accordingly, the user can be easily recognize the sorting information as for the receivable broadcasts even if there is no receivable broadcast in the desired sort of broadcast. Such a notification may be performed by displaying or announcing the message to indicate the stored input sorting information.

In another aspect of the selecting method of the present invention, frequency information of each of the broadcast waves is stored in association with the input sorting information in the storing step. One of the broadcast waves is selected on the basis of the stored frequency information as well as the stored input sorting information in the secondly selecting step. Accordingly, since the frequency information of the selected broadcast wave is already obtained, the receiving operation of the selected broadcast wave can be easily and promptly executed by the receiving system.

In another aspect of the selecting method of the present invention, program identifier information and receiving quality information of each of the broadcast waves are stored in association with the input sorting information in the storing step. One of the broadcast waves is selected, which has the best receiving quality according to the stored receiving quality information in case that there are a plurality of broadcasts for a same program able to select according to the stored program identifier information, in the secondly selecting step. Accordingly, if there are a plurality of broadcasts for the same program, the broadcast having the best receiving quality can be automatically obtained.

In another aspect of the selecting method of the present invention, program identifier information of each of the broadcast waves is stored in association with the input sorting information, such that the input sorting information and the program identifier information for a same program are not redundantly stored, in the storing step. Accordingly, even if there are a plurality of broadcasts for the same program, it becomes possible to avoid storing useless redundant information and the memory capacity for storing the input sorting information can be saved.

In another aspect of the selecting method of the present invention, the selecting method further includes the step of secondly judging whether or not the input sorting information is stored by the storing step. In the secondly selecting step, one of the broadcast waves is selected if the input sorting information is judged to be stored by the secondly judging step. Accordingly, it is possible to avoid executing the secondly selecting step if it is not necessary.

The above object of the present invention can be also achieved by an apparatus for selecting one of broadcast waves, which are received by a receiving system for receiving the broadcast waves in each of which a sub signal including input sorting information to indicate a sort of broadcast for each of the broadcast waves is multiplexed on a main signal. The selecting apparatus is provided with: a setting device for setting a set sorting information to specify a desired sort of broadcast to be received; a judgement device for judging whether or not the input sorting information of each of the received broadcast waves is coincident with the set sorting information; a memory device for storing the input sorting information if the input sorting information is not judged to be coincident by the judgement device; a first selection device for selecting one of the broadcast waves having the input sorting information, which is judged to be coincident by the judgement device, if at least one of the input sorting information is judged to be coincident by the judgement device; and a second selection device for selecting one of the broadcast waves having the input sorting information, which is not judged to be coincident by the judgement device, on the basis of the stored input sorting information if none of the input sorting information is judged to be coincident by the judgement device.

According to the selecting apparatus of the present invention, one of broadcast waves is selected. The set sorting information is set in advance by the setting device. After that, when a desired broadcast is to be searched by the user, it is judged whether or not the input sorting information of each of the received broadcast waves is coincident with the set sorting information by the judgement device. According to the result of this judgement, if the input sorting information is not judged to be coincident with the set sorting information, the input sorting information is stored to the memory device. If at least one of the input sorting information is judged to be coincident with the set sorting information, one of the broadcast waves having the input sorting information, which is judged to be coincident with the set sorting information, is selected as the desired broadcast which belongs to the originally desired sort of broadcast, by the first selection device. On the other hand, if none of the input sorting information is judged to be coincident with the set sorting information, one of the broadcast waves having the input sorting information, which is not judged to be coincident with the set sorting information, is selected, on the basis of the stored input sorting information, as the desired broadcast which does not belong to the originally desired sort of broadcast but which is still receivable, by the second selection device. In this manner, the selection of one broadcast based on the desired sort of broadcast or the selection of another receivable broadcast can be easily performed by making the best use of one searching operation according to the selecting apparatus of the present invention.

In one aspect of the selecting apparatus of the present invention, the selecting apparatus is further provided with a notification device for notifying the stored input sorting information if none of the input sorting information is judged to be coincident by the judgement device. Accordingly, the user can be easily recognize the sorting information as for the receivable broadcasts by virtue of the notification device. Such a notification may be performed by displaying or announcing the message to indicate the stored input sorting information.

In another aspect of the selecting apparatus of the present invention, the memory device further stores frequency information of each of the broadcast waves in association with the input sorting information. The second selection device selects one of the broadcast waves on the basis of the stored frequency information as well as the stored input sorting information. Accordingly, since the frequency information of the selected broadcast wave is already obtained i.e. stored in the memory device, the receiving operation of the selected broadcast wave can be easily and promptly executed by the receiving system.

In another aspect of the selecting apparatus of the present invention, the memory device further stores program identifier information and receiving quality information of each of the broadcast waves in association with the input sorting information. The second selection device selects one of the broadcast waves, which has the best receiving quality according to the stored receiving quality information in case that there are a plurality of broadcasts for a same program able to select according to the stored program identifier information. Accordingly, if there are a plurality of broadcasts for the same program, the broadcast having the best receiving quality can be automatically obtained.

In another aspect of the present invention, the memory device further stores program identifier information of each of the broadcast waves in association with the input sorting information, such that the input sorting information and the program identifier information for a same program are not redundantly stored. Accordingly, even if there are a plurality of broadcasts for the same program, it becomes possible to avoid storing useless redundant information to the memory device, and the memory capacity can be saved.

In another aspect of the selecting apparatus of the present invention, the selecting apparatus is further provided with a second judgement device for judging whether or not the input sorting information is stored by the memory device. The second selection device selects one of the broadcast waves if the input sorting information is judged to be stored by the second judgement device. Accordingly, it is possible to avoid executing the operation of the second selection device if it is not necessary.

The above object of the present invention can be also achieved by a receiving system provided with: a receiver for receiving broadcast waves in each of which a sub signal including input sorting information to indicate a sort of broadcast for each of the broadcast waves is multiplexed on a main signal; a detection device for detecting the input sorting information out of each of the received broadcast waves; the above described selecting apparatus of the present invention; a demodulation device for demodulating the main signal of the selected broadcast wave; and a sound generation device for generating a sound based on the demodulated main signal. Thus, the selection of one broadcast based on the desired sort of broadcast or the selection of another receivable broadcast can be easily performed by making the best use of one searching operation according to the receiving system of the present invention.

In one aspect of the receiving system of the present invention, the demodulation device demodulates the main signal of each of the broadcast waves having the input sorting information, which is judged to be coincident with the set sorting information. The sound generation device generates the sound based on each demodulated main signal. Accordingly, the content of each broadcast, which belongs to the desired sort of broadcast can be sound-outputted, so that the user can confirm it by respectively hearing it.

In another aspect of the receiving system of the present invention, the demodulation device demodulates the main signal of each of the broadcast waves having the input sorting information, which is stored in the memory device. The sound generation device generates the sound based on each demodulated main signal. Accordingly, the content of each receivable broadcast, which does not belong to the desired sort of broadcast, can be sound-outputted, so that the user can confirm it by respectively hearing it.

The nature, utility, and further features of this invention will be more clearly apparent from the following detailed description with respect to preferred embodiments of the invention when read in conjunction with the accompanying drawings briefly described below.

BRIEF DESCRIPTION OF THE DRAWINGS

FIG. 2 is a diagram showing a construction of a PTY memory;

DETAILED DESCRIPTION OF THE PREFERRED EMBODIMENTS

Referring to the accompanying drawings, embodiments of the present invention will be now explained.

i) First Embodiment

A first embodiment of the present invention is constructed to sound-output the content of the broadcasting station one after another which is selected on the basis of the PTY instructed to be received by a user.

Figure 1:
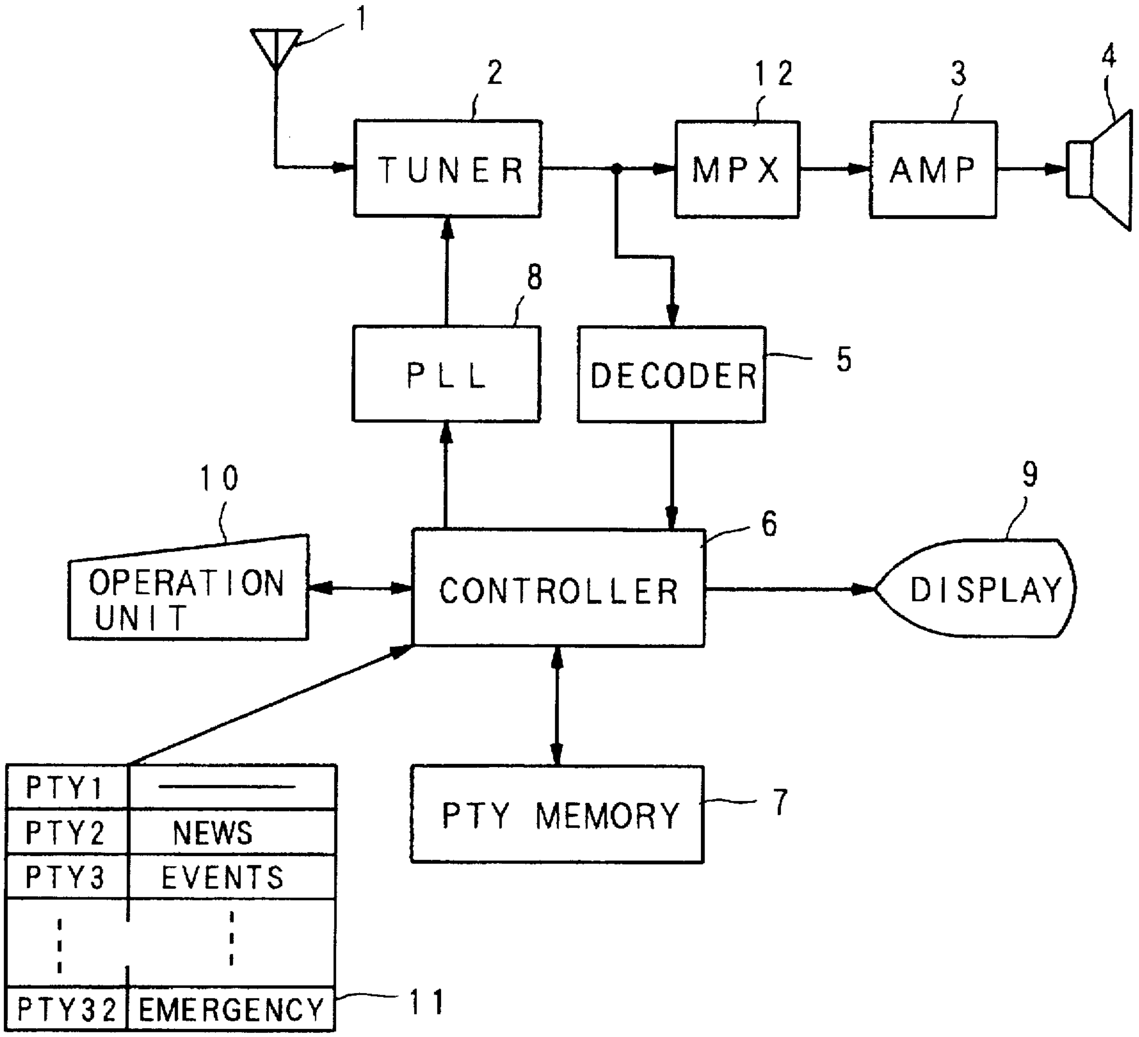
FIG. 1 is a block diagram of an RDS receiving system in embodiments of the present invention.

FIG. 1 shows a construction of an RDS receiving system as the first embodiment. As shown in FIG. 1, the RDS receiving system of the present invention is provided with: an antenna 1 for receiving a broadcast electric wave; a tuner 2 for outputting a front end and a detection signal; an amplifier 3 for power-amplifying an audio signal selected from the detection output by a stereo demodulation unit (MPX unit) 12; and a speaker 4 for converting the power-amplified audio signal to a sound wave, to demodulate the audio signal.

The RDS receiving system of the present embodiment is provided with: a decoder 5; a controller 6; a PTY memory 7; a PLL (Phase Locking Loop) circuit 8; a display unit 9; and an operation unit 10. The decoder 5 decodes and generates the PTY code from the detection output outputted from the tuner 2. The controller 6 receives this generated PTY code, and controls the PTY memory 7 to store this, and judges whether or not the PTY (i.e. the input PTY), which is stored in the PTY memory 7, and the set PTY, which is inputted through the operation unit 10 by the user, are coincident with each other. Further, the controller 6 controls the PLL circuit 8 and the display unit 9. The PTY memory 7 stores the input PTY code, which is inputted through the controller 6 from the tuner 2, the identifier PI (Program Identification) of the broadcast, which is selected, the receiving frequency f, the receiving condition Q etc., with adding the address corresponding to each input PTY code respectively. The PTY memory 7 may have a RAM (Random Access Memory). The PLL circuit 8 sets the frequency to be received to the tuner 2. The display unit 9 displays the frequency information, the program type, the channel number and so on. The operation key 10 is a terminal apparatus for the user to specify the program type and the channel. A data memory 11 stores the information of the program type corresponding to each PTY code shown in Table 1.

TABLE 1

| CODE NO. | PTY CODE | CONTENT OF PROGRAM TYPE |
|---|---|---|
| 1 | 00000 | NOT-DEFINED |
| 2 | 00001 | NEWS |
| 3 | 00010 | EVENTS |
| 4 | 00011 | INFORMATION |
| 5 | 00100 | SPORT |
| 6 | 00101 | EDUCATION |
| 7 | 00110 | DRAMA |
| 8 | 00111 | CULTURE |
| 9 | 01000 | SCIENCE |
| 10 | 01001 | VARIETY |
| 11 | 01010 | POP-MUSIC |
| 12 | 01011 | ROCK MUSIC |
| 13 | 01100 | MODERN MUSIC |
| 14 | 01101 | LIGHT MUSIC |
| 15 | 01110. | CLASSIC |
| 16 | 01111 | OTHER MUSIC |
| 17–31 | | NOT-DEFINED |
| 32 | 11111 | EMERGENCY |

The controller 6 controls the display unit 9 to display the corresponding program type with referring to the data memory 11. The user sets the set PTY code by an operation of the operation unit 10.

FIG. 2 shows a conceptual internal construction of the PTY memory 7. As shown in FIG. 2, the input PTY codes are stored in the order from the specific address (e.g. the lower address) of the PTY memory 7. This input PTY code corresponds to the number of the PTY shown in the Table 1. With respect to each of the input PTY codes, there are provided areas respectively to store the broadcast identifier PI to identify the selected broadcasting station, to store the receiving frequency f of the selected broadcasting station, and to store the receiving condition Q of the selected broadcasting station. The input PTY code PTYi is to show what kind of other PTY can be received. The broadcast identifier PIi is to prevent redundant storage of the additional information of the same broadcasting station. The receiving frequency fi is to receive the broadcasting station on the basis of the receiving instruction which frequency is specified. The receiving condition Qi is to receive the broadcasting station which receiving condition is the best.

Figure 3:
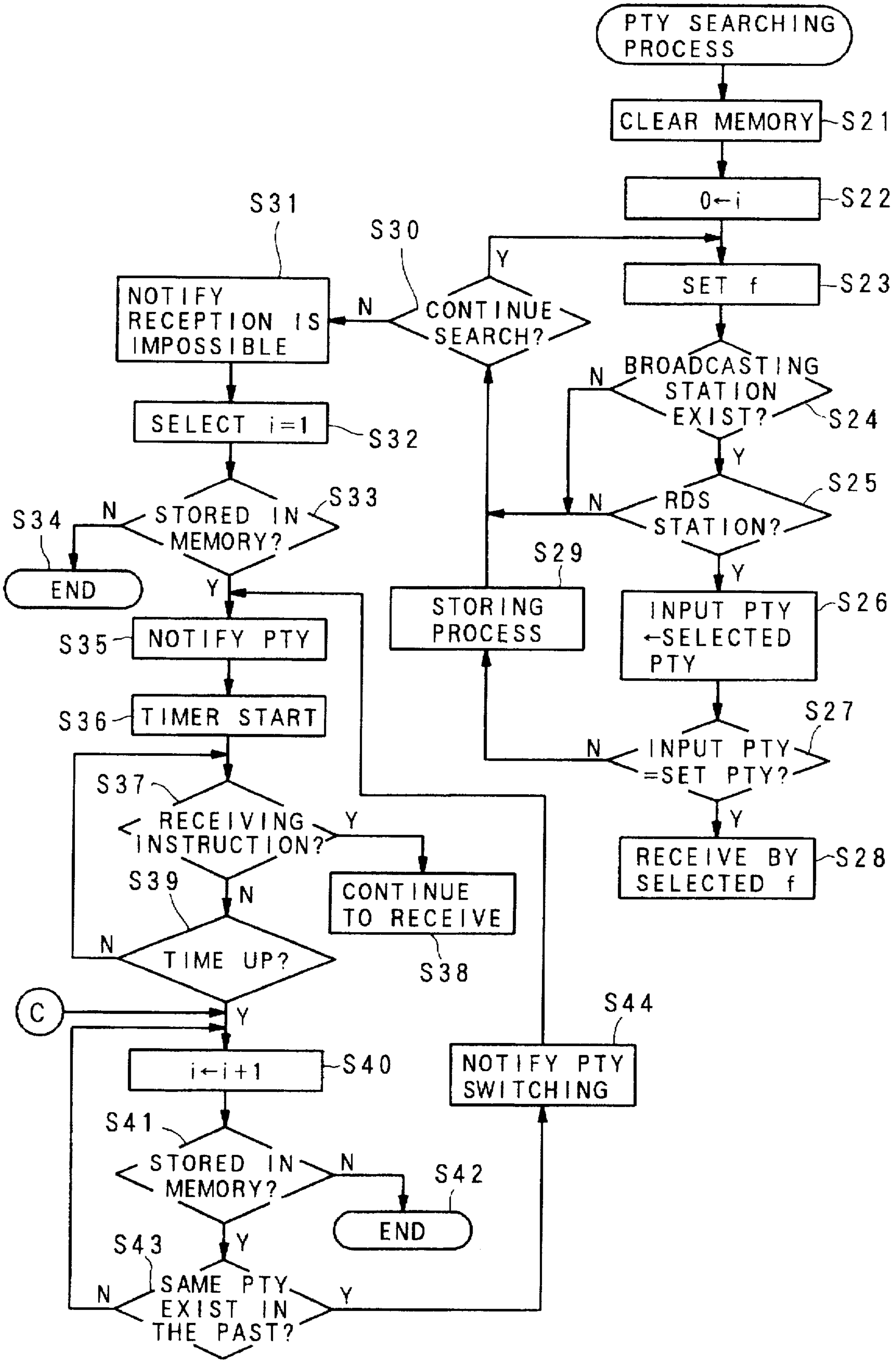
FIG. 3 is a flow chart of the PTY searching process in the first embodiment of the present invention.
Figure 4:
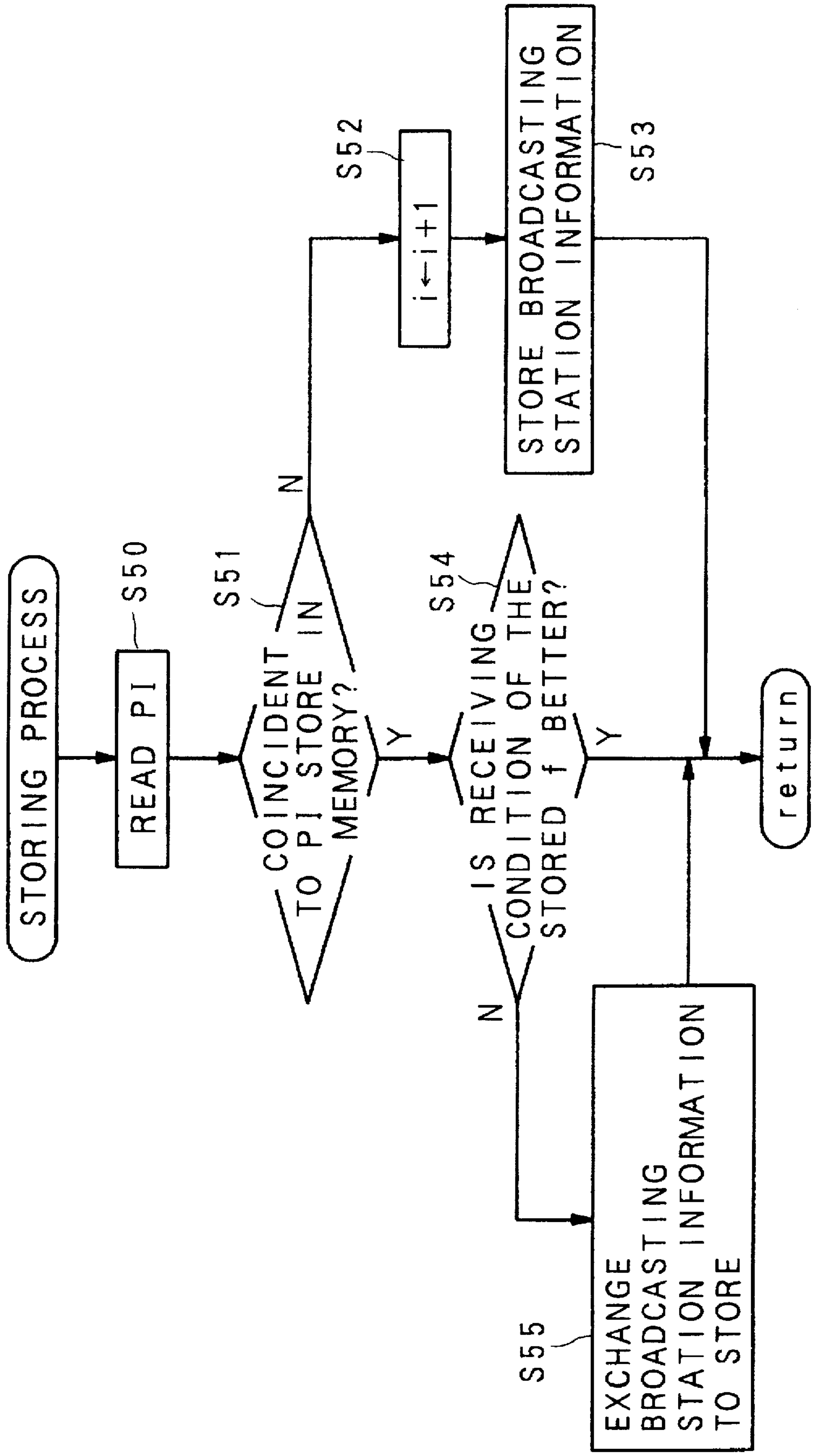
FIG. 4 is a flow chart of the storing process in the PTY searching process of the embodiments.
Figure 5:
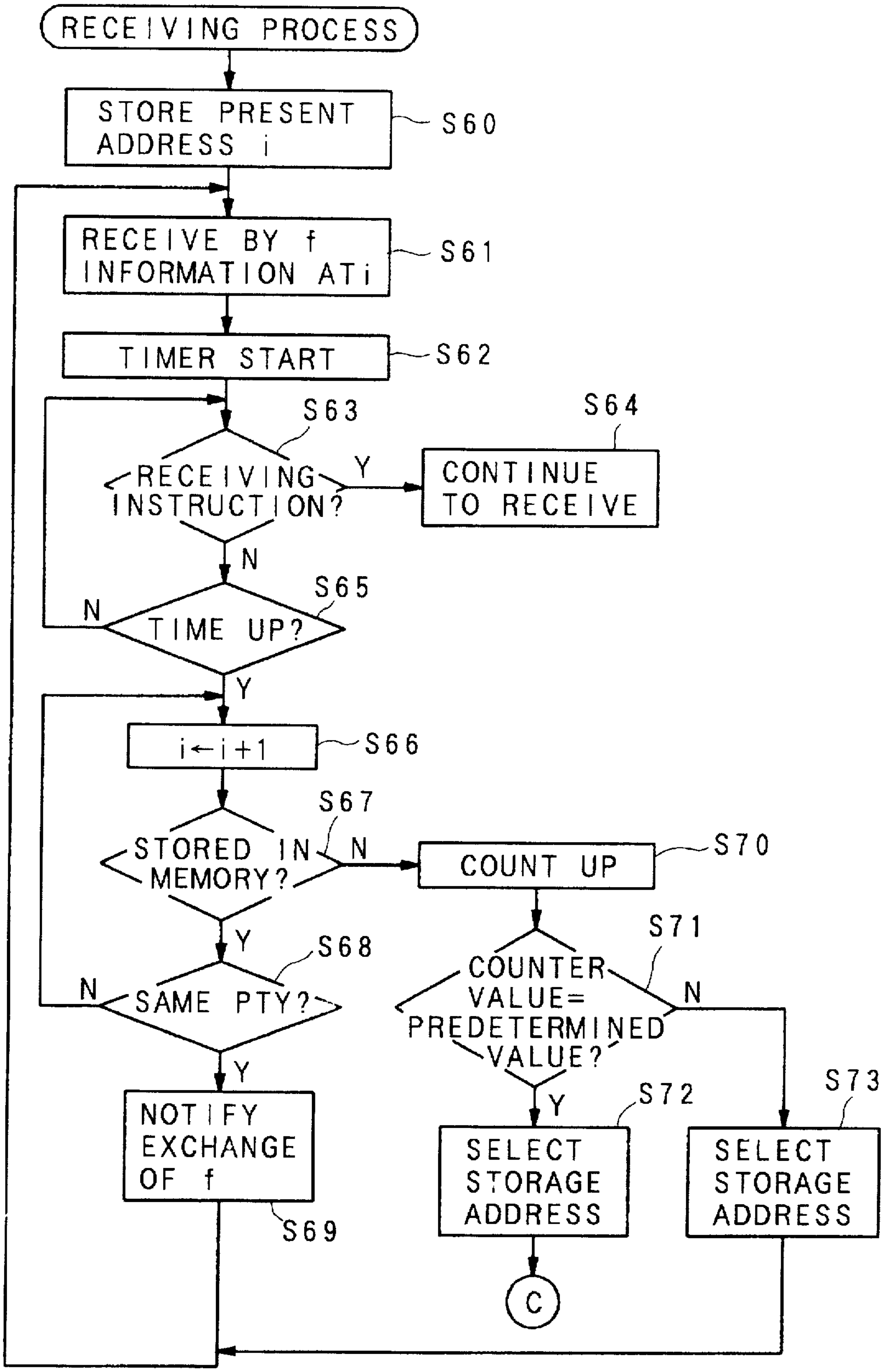
FIG. 5 is a flow chart of the receiving process in the PTY searching process of the embodiments.

Nextly, an operation of the RDS receiving system of the first embodiment is explained with referring to flow charts of FIGS. 3 to 5.

FIG. 3 shows the flow chart of the PTY searching process.

In FIG. 3, the controller 6 firstly clears up the PTY memory 7 as an initialization setting operation (step S21). The address i of the PTY memory 7 is set to be "0" (see FIG. 2) (step S22). The PLL circuit 8 is controlled to set the selection frequency f (step S23). For example, it is set to a frequency which is obtained by increasing or decreasing the presently received frequency by one step. Nextly, the controller 6 judges whether or not there exists a broadcasting station corresponding to the set frequency according to the intermediate frequency level and the detection wave output (step S24). If there exists the broadcasting station of the set frequency (step S24, Yes), it is judged whether or not the broadcasting station of the set frequency is the RDS station (step S25). The judgement whether or not it is the RDS station can be judged, for example, by judging whether or not the synchronization can be achieved with the RDS data.

Nextly, if the broadcasting station of the set frequency is the RDS station (step S25, YES), the controller 6 sets the PTY, which is obtained from the RDS data of the selected RDS station, as the input PTY (step S26). It is judged whether or not the PTY (i.e. the set PTY), which is set by the user through the operation unit 10, and the input PTY are coincident with each other (step S27). If the set PTY and the input PTY are coincident with each other (step S27, Yes), the receiving process is performed by use of the selected frequency f (step S28). Namely, the reception of the station which is presently selected is continued and the PTY searching process is ended.

Hereinbelow, the process in the event where the set PTY and the input PTY are not coincident with each other, is explained, which is the characteristic process of the present embodiment.

Namely, if the input PTY and the set PTY are not coincident with each other (step S27, NO), the controller 6 sets the address to the PTY memory 7 so as to store at least the PTY code and the receiving frequency f among the information as for the selected broadcasting station, to the predetermined address (step S29). At this time, it is preferred that the identifier PI of the selected broadcast and the receiving condition Q of the broadcast from the pertinent broadcasting station are stored together with the input PTY code. The storing process will be described later in detail with referring to FIG. 4.

Nextly, the controller 6 judges whether or not the searching process is to be continued (step S30). For example, this judgement is performed by judging whether or not the searching process has covered all of the predetermined frequency range. Namely, it is judged that the searching process is not to be continued if the searching process has covered all of the predetermined frequency range. The same thing can be said as for the case where the broadcasting station does not exist at the set frequency (step S24, No) and the case where the broadcasting station of the set frequency is not the RDS station (step S25, NO). If it is judged that the searching process is to be continued (step S30, YES), the above steps S23 to S29 are repeated.

Nextly, if it is judged that the searching process is not to be continued (step S30, NO), the controller 6 notifies to the user the fact that the set PTY could not be received, by displaying it on the display unit 9 or by announcing it (step S31). Nextly, when the address of the PTY to be notified in the PTY memory 7 is initially set (step S32), the controller 6 judges whether or not the information is stored in the PTY memory 7 at the selected address (step S33). In addition, the initial setting of the address is performed such that "i=1" is selected, on an assumption that the information is stored in the order from the lower address, in FIG. 2. If the information is not stored in the PTY memory 7 at the selected address (step S33, NO), the PTY searching process is ended (step S34). If the information is stored in the PTY memory 7 at the selected address (step S33, YES), the PTY at the selected address is notified (step S35).

After that, the controller 6 counts the predetermined time period, and performs the receiving process in case that the station selection instruction is given within this predetermined time period. Namely, the controller 6 starts the timer to count this predetermined time period (step S36), and judges whether or not the receiving instruction is given by the user (step S37). If there is the receiving instruction given (step S37, YES), the receiving process is started (step S38). The receiving process will be described later in detail with referring to FIG. 5. Nextly, the controller 6 judges whether or not the timer gets to a time up condition (step S39). If it does not get to the time-up condition (step S39, NO), the above steps S37 to S39 are repeated. If it gets to the time-up condition (step S39, YES), the next address i+1 is selected (step S40), and it is judged whether or not the information is stored in the PTY memory 7 at the selected address (step S41). If the information is not stored (step S41, NO), the PTY process is ended (step S42). If the information is stored (step S41, YES), the controller 6 refers to the PTY memory 7, and judges whether or not the selected PTY is coincident with the PTY, which has been notified in the past (step S43). The reason why this kind of process is performed is to avoid notifying the same PTY again in case where there exist a plurality of same PTYs which are receivable in the receiving band range. If the selected PTY is the same as the PTY notified in the past (step S43, YES), the above steps S40 to S42 are repeated. On the other hand, if the selected PTY is not same as the PTY notified in the past (step S43, NO), the above steps S35 to S43 are repeated after it is notified switching the PTY by a beep sound etc. (step S44). Namely, if there is no receiving instruction given, the above process is repeated until the notifications of the whole content of the memory 7 are completed.

FIG. 4 shows a flow chart of the storing process at the step S29 of FIG. 3. In FIG. 4, the controller 6 firstly reads out the PI information of the receiving station from the demodulated data (step S50), and judges whether or not the read PI is coincident with the PI stored in the PTY memory 7 (step S51). If the read PI information is not coincident with the PI stored in the PTY memory 7 (step S51, NO), the new address of the PTY memory 7 is set as "$i \leftarrow i+1$" (step S52), and the broadcasting information (e.g. the PTY code, the broadcast identifier PI, the receiving frequency f, the receiving condition Q) is stored to this address (step S53). If the read PI information is coincident with the PI stored in the PTY memory (step S51, YES), the receiving conditions or qualities are compared with each other since the same contents are broadcasted. For judging the quality of the receiving condition, the intermediate frequency levels are compared with each other, and one who has the higher intermediated frequency level is judged to be the better one. Namely, the controller 6 reads the receiving condition Qi of the PI same as that of the presently received broadcast from the PTY memory 7, and compares it with the receiving condition Qi+1 of the presently received broadcast (step S54). If the receiving condition Qi stored in the PTY memory 7 is better than the receiving condition Qi+1 of the presently received broadcast (step S54, YES), the storing process is ended, so that it returns to the PTY searching process of FIG. 3. If the receiving condition Qi+1 of the presently received broadcast is better than the receiving condition Qi stored in the PTY memory 7 (step S54, NO), the broadcasting station information is exchanged to be stored to the PTY memory 7 (step S55).

In this manner, by storing the PI into the PTY memory 7, it can be prevented to store the additional information of the same broadcasting station redundantly. By storing the receiving condition Q, the broadcasting station which receiving condition is the best can be selected.

In the storing process shown in the flow chart of FIG. 4, although the broadcasting station information of the same broadcasting station is not stored at the time of storage, it is also possible that all of the broadcasting station information are once recorded at the time of storage, and the broadcasting station information of the same PI is deleted at the time of notification, as a modified example.

FIG. 5 shows a flow chart of the receiving process at the step S38 of FIG. 3. In FIG. 5, the controller 6 stores the present address number i (step S60), controls the PLL circuit 8 and the tuner 2 to receive the broadcast on the basis of the receiving frequency information f at the address i where the PTY instructed to be received is stored, and controls the amplifier 3 and the speaker 4 to output the sound (step S61). Nextly, the controller 6 starts the timer (step S62), and judges whether or not the receiving instruction is given or not (step S63). If the receiving instruction is given (step S63, YES), the present receiving operation is continued (step S64). If the receiving instruction is not given (step S63, NO), the controller 6 judges whether or not the timer gets to the time up condition (step S65). If it does not get to the time up condition (step S65, NO), the above steps S63 to S64 are repeated. If it gets to the time up condition (step S65, YES), namely if the receiving instruction is not given within the predetermined time period, the controller 6 resets the set address to "i+1" (step S66), and judges whether or not the storage content exists in the PTY memory 7 (step S67). If there exists the storage content in the PTY memory 7 (step S67, YES), it is judged whether or not there exists the same PTY (step S68). If there does not exist the same PTY (step S68, NO), the above steps S66 and S67 are repeated. If there exists the same PTY (step S68, YES), the exchange of the receiving frequency f is notified (step S69), and the steps S61 to S68 are repeated. On the other hand, if the storage content of the PTY memory 7 does not exist (step S67, NO), namely if the pointer reaches the end of the storage address, the controller 6 increments the counter value by one and judges whether or not the count value coincides with the predetermined value (step S71). This counter indicates the reading out number of the storage content of the PTY memory 7. The initial value of the counter is set to be "1" and the predetermined value is set to be "2" in order to judge whether or not the whole storage contents are read through once. If the count value reaches the predetermined value (step S71, YES), the storage address is called out (step S72), and the searching process of FIG. 3 is continued. On the other hand, if the count value does not reach the predetermined value (step S71, NO), the storage address is called out (step S73), and the steps S61 to S67 are repeated.

By this process, after selecting the predetermined PTY, it becomes possible to confirm the broadcast content of the PTY by sound-outputting it one after another. Further, by this process, it becomes possible to firstly confirm the broadcast content at the 1st loop, and perform an operation to output the receiving instruction at the 2nd loop.

According to the first embodiment, it is possible to sound-output the content of the selected broadcasting station one after another on the basis of the PTY which is instructed to receive by the user.

ii) Second Embodiment

The construction of the RDS receiving system of the second embodiment is the same as that of the first embodiment, and the explanation thereof is omitted.

Figure 6:
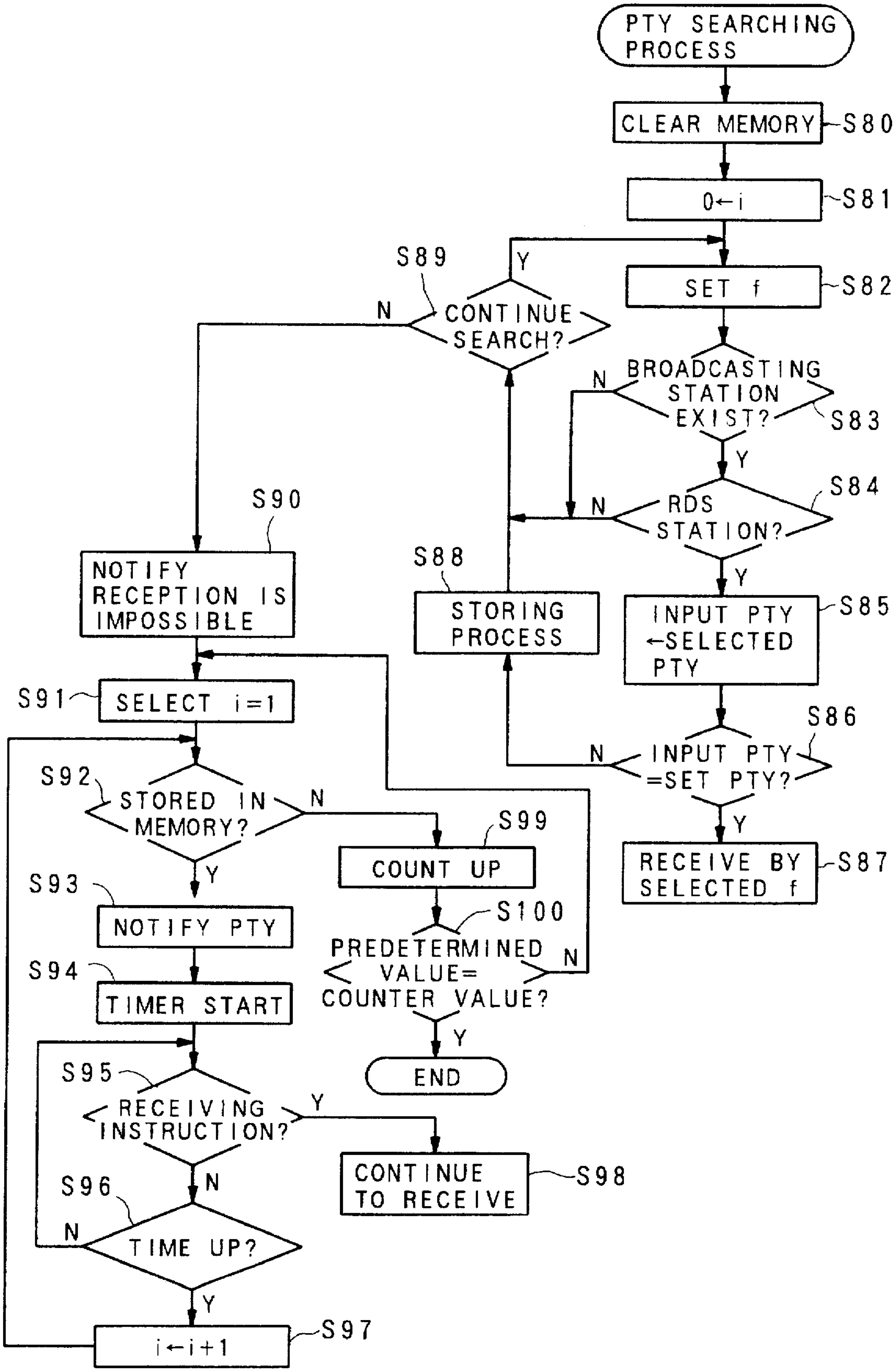
FIG. 6 is a flow chart of the PTY searching process in the second embodiment of the present invention.

Nextly, the operation of the RDS receiving system of the second embodiment is explained with referring to a flow chart of FIG. 6. The second embodiment is constructed such that the broadcast content is confirmed by sound-outputting the whole information stored in the PTY memory.

The steps S80 to S91 in the flow chart of FIG. 6 are the same as the steps S21 to S32 in the flow chart of FIG. 3.

In FIG. 6, the controller 6 firstly clears up the PTY memory 7 as the initialization setting operation (step S80). The address of the PTY memory 7 is set to be "0" (see FIG. 2) (step S81). The PLL circuit 8 is controlled to set the selection frequency f (step S82). For example, it is set to a frequency which is obtained by increasing or decreasing the presently received frequency by one step. Nextly, the controller 6 judges whether or not there exists a broadcasting station at the frequency set according to the intermediate frequency level and the detection wave output (step S83). If there exists the broadcasting station at the set frequency (step S83, Yes), it is judged whether or not the broadcasting station of the set frequency is the RDS station (step S84). The judgement whether or not it is the RDS station can be judged, for example, by judging whether or not the synchronization can be achieved with the RDS data.

Nextly, if the broadcasting station at the set frequency is the RDS station (step S84, YES), the controller 6 sets the PTY, which is obtained from the RDS data of the selected RDS station, as the input PTY (step S85). It is judged whether or not the PTY (the set PTY) which is set by the user through the operation unit 10, and the input PTY are coincident with each other (step S86). If the set PTY and the input PTY are coincident with each other (step S86, Yes), the receiving process is performed by use of the selected frequency f (step S87). Namely, the reception of the station which is presently selected is continued and the PTY searching process is ended.

Hereinbelow, the process in the event where the set PTY and the input PTY are not coincident with each other, which is the characteristic feature of the present invention, is explained.

Namely, if the input PTY and the set PTY are not coincident with each other (step S86, NO), the controller 6 sets the address to the PTY memory 7 so as to store at least the PTY code and the receiving frequency f among the information of the selected broadcasting station, to the predetermined address (step S88). At this time, it is preferred to store the identifier PI of the selected broadcast and the receiving condition Q of the broadcast from the broadcasting station together with the input PTY code.

Nextly, the controller 6 judges whether or not the searching process is to be continued (step S89). For example, this judgement is performed by judging whether or not the searching process covers all of the predetermined frequency range. Namely, if the searching process covers all of the predetermined frequency range, it is possible to judge that the searching process is not to be continued. The same thing can be said in a case where the broadcasting station does not exists at the set frequency (step S83, NO), and in a case where the broadcasting station at the set frequency is not the RDS station (step S84, NO). If it is judged that the searching process is to be continued (step S89, YES), the above steps S82 to S88 are repeated.

Nextly, if it is judged that the searching process is not to be continued (step S89, NO), the controller 6 notifies to the user by displaying the message that the set PTY could not be received, on the display or by announcing it (step S90). Nextly, when the address of the PTY to be notified in the PTY memory is initially set (step S91), the controller judges whether or not the information is stored in the PTY memory 7 at the selected address (step S92). The initial setting of the address is done such that "i=1" is selected on an assumption that the information is recorded in the order from the lower address. If the information is not recorded in the PTY memory 7 at the selected address (step S92, NO), the controller 6 controls the PLL circuit 8 and the tuner 2 to receive the broadcast on the basis of the receiving frequency information f at the address i of the PTY instructed to be received, so as to perform the sound-output through the amplifier 3 and the speaker 4 (step S93). Nextly, the controller starts the timer (step S94), and judges whether or not the receiving instruction is given (step S95). If the receiving instruction is given (step S95, YES), the present receiving operation is continued and the PTY searching process is ended (step S98). If the receiving instruction is not given (step S95, NO), the controller 6 judges whether or not the timer gets to the time up condition (step S96). If it does not get to the time up condition (step S96, NO), the above step S95 is repeated. If it gets to the time up condition (step S96, YES), namely, if the receiving instruction is not given within the predetermine time period, the controller 6 resets the set address to "i+1" (step S97), and the above steps S92 to S96 are repeated. On the other hand, if the storage content of the PTY memory 7 does not exists (step S92, NO), namely, if the pointer reaches to the end of the memory address, the controller 6 increments the counter value by one (step S99), and judges whether or not the counter value is coincident with the predetermined value (step S100). The counter indicates the number of reading out times of the storage content of the PTY memory. The initial value of the counter is set to be 1 and the predetermined value is set to be 2 in order to judges whether or not the whole content of the PTY memory are read through once. If the counter value reaches to the predetermined value (step S100, YES), the PTY searching process is ended. On the other hand, if the count value does not reach the predetermined value (step S100, NO), the above steps S91 to S92 are repeated.

According to the second embodiment, since the broadcast content can be confirmed by sound-outputting the whole information stored in the PTY memory, it becomes possible to search the broadcasting station to be selected in the 1st cycle of the PTY searching while listening to it, and give the receiving instruction in the 2nd cycle of searching.

The storing process and the receiving process of the second embodiment are same as those of the first embodiment, and the explanations thereof are omitted.

iii) Other Modified Embodiments

The present invention is not limited to the above embodiments and various modifications are possible.

For example, although the above embodiments are explained as for the case of PTY searching, the present invention can be adapted to other types of information to select and receive the broadcasting station such as PI. In this case, the PI searching operation is conducted in place of the PTY searching operation, so that, in case that there is no receivable PI station, the other receivable PI station is notified and the reception is started on the basis of the receiving instruction As described above in detail, according to the present embodiments, even if the desired broadcasting station cannot be received by the PTY searching operation, it is possible to notify the user the information as for the other broadcasting station which broadcast can be received. Further, by giving the receiving instruction, it is possible to start the reception. Furthermore, in case that a plurality of broadcasts of the broadcasting stations having the same PI can be received, the broadcast of the broadcasting station which receiving condition is the best can be received, and it is possible to avoid the redundant notification of the broadcasting station information of the same broadcast (i.e. the same PI).

Especially, according to the first embodiment, at the step S43, it is judged whether or not the same PTY has ever exist in the past, and the notification is performed only in case that the same PTY has never exist in the past, so that the redundant notification of the same PTY can be avoided. Further, since the sound-output is performed only with respect to the PTY instructed to be received, the whole processing time becomes short.

Especially, according to the second embodiment, since all of the received audio sound of the receivable stations are outputted, the user can select the broadcasting station by the audio sound, and the user can search the audio sound of the broadcasting station to be selected in the first cycle of the PTY searching operation, and can give the receiving instruction in the second cycle of the PTY searching operation, The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A method of selecting one of a plurality of broadcast waves, which are searched by a receiving system for receiving the broadcast waves each of which has a subsignal multiplexed on a main signal, each subsignal including characteristic code information indicative of a type of broadcast for each of the broadcast waves, said method comprising the steps of:

inputting a selection code to specify a desired first type of broadcast to be received;

determining whether or not the characteristic code information of each of the searched broadcast waves matches the selection code;

storing the characteristic code information if it is not determined to match the selection code;

selecting one of the first type of broadcasts from the searched broadcast waves, as the selected broadcast wave to be received, if the characteristic code information of at least one of the searched broadcast waves is determined to match the selection code;

providing a user-perceptible sisal indicative of the stored characteristic code information, if none of the characteristic code information of the searched broadcast waves is determined to match the selection code; and selecting one of a second type of broadcasts having characteristic code information that does not match the selection code, as the selected broadcast to be received, based upon the stored characteristic code information if none of the characteristic code information is determined to match the selection code.

2. A method according to claim 1, wherein in the storing step, frequency information for each of the searched broadcast waves is stored in association with the characteristic code information, and in said selecting one of a second type of broadcast step, said one of the broadcast waves is selected based upon the stored frequency information as well as the stored characteristic code information.

3. A method according to claim 1, wherein in the storing step, program identifier information and receiving quality information for each of the broadcast waves are stored in association with the characteristic code information, and in the selecting one of a second type of broadcast step, said one of the broadcast waves selected has the best receiving quality according to the stored receiving quality information when there are a plurality of broadcasts with the same program able to be selected according to the stored program identifier.

4. A method according to claim 1, wherein, in the storing step, program identifier information for each of the broadcast waves is stored in association with the characteristic code information, such that the characteristic code information and the program identifier information for a same program are not redundantly stored.

5. A method according to claim 1, wherein the characteristic code information used in said matching, storing, and selecting steps is selected from the group consisting essentially of program type code, program identifier code, and group type code.

6. An apparatus for selecting one of a plurality of broadcast waves, which are searched by a receiving system for receiving the broadcast waves each of which has a subsignal multiplexed on a main signal, each subsignal including characteristic code information indicative of a type of broadcast for each of the broadcast waves, said apparatus comprising:

an operation unit manually settable to specify a selection code indicative of a desired first type of broadcast to be received;

a comparison circuit operable to determine whether or not the characteristic code information of each of the searched broadcast waves matches the selection code;

a memory device for storing the characteristic code information if it does not match the selection code;

a controller having a first selection circuit operable to select one of the first type of broadcasts from the searched broadcast waves, as the selected broadcast wave to be received, if the characteristic code information of at least one of the searched broadcast waves is determined by the comparison circuit to match the selection code;

a signaling device operable to output a user-perceptible signal indicative of the stored characteristic code information when the comparison circuit determines that none of the characteristic code information matches the selection code;

said controller having a second selection circuit operable, when the comparison circuit determines that none of the characteristic code information of the searched broadcast waves matches the selection code, to select one of a second type of broadcast waves having characteristic code information that does not match the selection code, as the selected broadcast wave to be received, based upon the characteristic code information stored in the memory device.

7. An apparatus according to claim 6, wherein said memory device further stores frequency information for each of the broadcast waves in association with the characteristic code information, and said second selection circuit selects said one of the searched broadcast waves based upon the stored frequency information as well as the stored characteristic code information.

8. An apparatus according to claim 6, wherein said memory device further stores program identifier information and receiving quality information for each of the searched broadcast waves in association with the characteristic code information, and said second selection circuit selects said one of the searched broadcast waves having the best receiving quality according to the stored receiving quality information when there are a plurality of broadcasts with the same program able to be selected according to the stored program identifier information.

9. An apparatus according to claim 6, wherein said memory device further stores program identifier information for each of the searched broadcast waves in association with the characteristic code information, such that the characteristic code information and the program identifier information for a same program are not redundantly stored.

10. An apparatus according to claim 6, wherein said characteristic code information is selected from the group consisting essentially of program type code, program identifier code, and group type code.

11. A receiving system comprising:

a receiver for searching and receiving broadcast waves each of which has a subsignal multiplexed on a main signal, each subsignal including characteristic code information indicative of a type of broadcast for each of the broadcast waves;

means for detecting the characteristic code information of each of the searched broadcast waves;

a selecting apparatus for selecting one of the searched broadcast waves to be received based upon the detected characteristic code information;

means for demodulating the main signal of the selected broadcast wave; and means for generating a sound based on the demodulated main signal, said selecting apparatus comprising:

means for specifying a selection code indicative of a desired type of broadcast to be received;

means for determining whether or not the characteristic code information of each of the searched broadcast waves matches the selection code;

a memory device for storing the characteristic code information if it does not match the selection code;

a first means for selecting one of the first type of broadcasts from the searched broadcast waves as the selected broadcast wave to be received, if the characteristic code information of at least one of the searched broadcast waves is determined by the determining means to match the selection code;

means for outputting a user-perceptible signal indicative of the stored characteristic code information when the determining means determines that none of the characteristic code information of the searched broadcast waves matches the selection code; and a second means for selecting one of a second type of broadcast waves having characteristic code information that does not match the selection code, as the selected broadcast to be received, based upon the characteristic code information stored in the memory device.

12. A system according to claim 11, wherein said demodulation means demodulates the main signal of each of the broadcast waves having characteristic code information determined to match the selection code by said determining means, and said sound generation means generates the sound based on each demodulated main signal.

13. A system according to claim 11, wherein said demodulation means demodulates the main signal of each of the broadcast waves having characteristic code information stored in the memory device, and said sound generation means generates the sound based on each demodulated main signal.

14. An apparatus according to claim 11, wherein said code information is selected from the group consisting essentially of program type code, program identifier code, and group type code.

* * * * *

UNITED STATES PATENT AND TRADEMARK OFFICE

CERTIFICATE OF CORRECTION

PATENT NO. : 5,697,080

DATED : December 9, 1997

INVENTOR(S) : KASA

It is certified that error appears in the above-identified patent and that said Letters Patent is hereby corrected as shown below:

In the Abstract, line 5, change "a main signal" to --on a main signal--.

Column 16, Line 12, change "said code" to --said characteristic code--.

Signed and Sealed this

Thirtieth Day of March, 1999

Attest:

Q. TODD DICKINSON

*Attesting Officer* *Acting Commissioner of Patents and Trademarks*